United States Patent
Tani et al.

(10) Patent No.: US 6,385,141 B1
(45) Date of Patent: May 7, 2002

(54) MAGNETO-OPTICAL RECORDING METHOD CAPABLE OF ADJUSTING THE SIZES MAGNETIC DOMAIN

(75) Inventors: Manabu Tani, Ibaraki; Hiroyuki Awano, Noda; Masafumi Yoshihiro; Masaki Sekine, both of Ibaraki, all of (JP)

(73) Assignee: Hitachi Maxell Ltd., Ibaraki (JP)

( * ) Notice: Subject to any disclaimer, the term of this patent is extended or adjusted under 35 U.S.C. 154(b) by 0 days.

(21) Appl. No.: 09/478,459

(22) Filed: Jan. 6, 2000

(30) Foreign Application Priority Data

Jan. 7, 1999 (JP) .......................................... 11-002083

(51) Int. Cl.⁷ ............................................. G11B 11/00
(52) U.S. Cl. ................... 369/13.54; 369/13.14
(58) Field of Search ................. 369/13, 14, 110.01, 369/116; 360/59, 114; 428/64.3, 694 ML (56) References Cited

U.S. PATENT DOCUMENTS 5,241,520 A * 8/1993 Ohta et al. ..................... 369/13
5,587,974 A * 12/1996 Nishimura .................... 369/13
5,963,512 A * 10/1999 Inoue et al. .................. 369/13

FOREIGN PATENT DOCUMENTS

| JP | A 2-101659 | 4/1990 |
| WO | WO98/02878 | 1/1998 |

OTHER PUBLICATIONS

Y. Murakami et al., Super Resolution Readout of A Magneto–Optical Disk with An In–Plane Magnetization Layer, Proceeding of Magneto–Optical Recording International Symposium '92, Journal of Magnetic Society of Japan, vol. 17, Supplement No. S1, pp. 201–204 (1993).

* cited by examiner

Primary Examiner—Tan Dinh
(74) Attorney, Agent, or Firm—Oliff & Berridge, PLC (57) ABSTRACT

A bit of binary information which is one of "1" and "0" is assigned to a domain pattern which is a combination of a recorded magnetic domain and a magnetic domain magnetized in the direction opposite to the direction in which the recording domain is magnetized. A bit of binary information which is the other of "1" and "0" is assigned to a domain pattern consisting of two magnetic domains magnetized in the same direction as the foregoing magnetic domain is magnetized. Consequently, two or more consecutive bits of record information are formed, on a recording layer, as a series of domain patterns each of which is a combination, as a record information unit, of a recorded magnetic domain and a magnetic domain magnetized in the direction opposite to the direction in which the recording domain is magnetized. Independent of the lengths of the magnetic domains recorded on the recording layer, the record information can be transferred to a reproducing layer. This makes it possible to reproduce high-density record information securely or reliably.

17 Claims, 10 Drawing Sheets

MAGNETO-OPTICAL RECORDING METHOD CAPABLE OF ADJUSTING THE SIZES MAGNETIC DOMAIN

BACKGROUND OF THE INVENTION

1. Field of the Invention

The present invention relates to a method and an apparatus for recording information on the recording layer of a magneto-optical recording medium. In particular, the invention relates to a recording method and a recorder which make it possible to form, on the recording layer of a magneto-optical recording medium, record marks from which information can be reproduced stably regardless of mark lengths of the record marks.

2. Description of Related Art

Optical recording media such as magneto-optical recording media are known as external memories for computers etc. Magneto-optical recording media can take or cover a great quantity of data such as dynamic images and voice, and are therefore used frequently as recording media in this multimedia era. In general, bits of information "1" and "0" are recorded as the presence and absence of record marks on a magneto-optical recording medium. For example, the light intensity modulation method and the magnetic field modulation method are known as methods of recording information on magneto-optical recording media.

The light intensity modulation method involves recording information by radiating a laser beam which intensity is modulated with record information, while applying a DC magnetic field to the recording layer of a magneto-optical recording medium. While the magnetic field in one direction is always applied, the information is recorded. Therefore, in order to record new information on that part of the recording layer where old information has been recorded, it is necessary to erase the old information before recording the new one. The magnetic field modulation method involves recording information by applying a magnetic field pulsed in accordance with bits of data, while radiating a DC laser beam onto the recording layer of a magneto-optical recording medium. It is possible to record the data by reversing the direction of magnetization of (part of) the recording layer with the recording magnetic field according to each bit of information "1" or "0". It is therefore possible to directly overwrite data. Because the DC laser beam is radiated, however, the record marks become crescent in shape and longer tangentially of the recording medium as the linear velocity increases. This is disadvantageous in processing the reproduced signals.

The optical (or light) magnetic field modulation method is known as an improvement on the magnetic field modulation method. The optical magnetic field modulation (light pulse-magnetic field modulation) method involves applying a magnetic field polarized in accordance with a record signal while radiating a light beam pulsed in synchronism with a recording clock. This method overcomes or eliminates the disadvantage of the magnetic field modulation method, and makes it possible to form minute recorded magnetic domains for high-density recording.

For densely recorded information, however, a number of recorded magnetic domains will be present within a reproducing light beam spot, and it is therefore not possible to reproduce information individually from them. In other words, the resolution of the reproducing light beam is insufficient to reproduce the information individually from the minute recorded magnetic domains. It is therefore necessary to reproduce information from minute recorded magnetic domains with a reproducing light beam spot having the conventional diameter.

As a method of solving this problem, the magnetically induced super resolution technique (MSR) is suggested in, for example, Journal of Magnetic Society of Japan, Vol. 17, Supplement, No. S1, pp. 201 (1993). Even if two recorded magnetic domains are present within a reproducing light beam spot, this technique makes it possible to reproduce information from one of the domains by masking the other out of sight to narrow the effective field of view. The use of this technique makes it possible to improve the reproducing resolution without reducing the diameter of the actual reproducing light beam spot. Even with the magnetically induced super resolution technique, however, the strength of the signal reproduced from each of the magnetic domains does not change, and therefore the C/N ratio of the reproduced signal is still low.

The inventor has disclosed in International Publication No. WO98/02878 a magneto-optical recording medium including a domain enlarging and reproducing layer and a recording layer which lie on a substrate. During reproduction, the minute magnetic domains on the recording layer are transferred individually to the reproducing layer while a reproducing magnetic field is applied to the reproducing layer so that the domains transferred to the reproducing layer can be enlarged and reproduced. The magnetic domains transferred to the domain enlarging and reproducing layer are enlarged approximately up to the light beam spot size. This remarkably increases the strength of the reproduced signals. This technique is called the MAMMOS (magnetic amplifying magneto-optical system), which solves the problem with the magnetically induced super resolution technique about the C/N ratio of the signals reproduced from minute magnetic domains.

Figure 2:
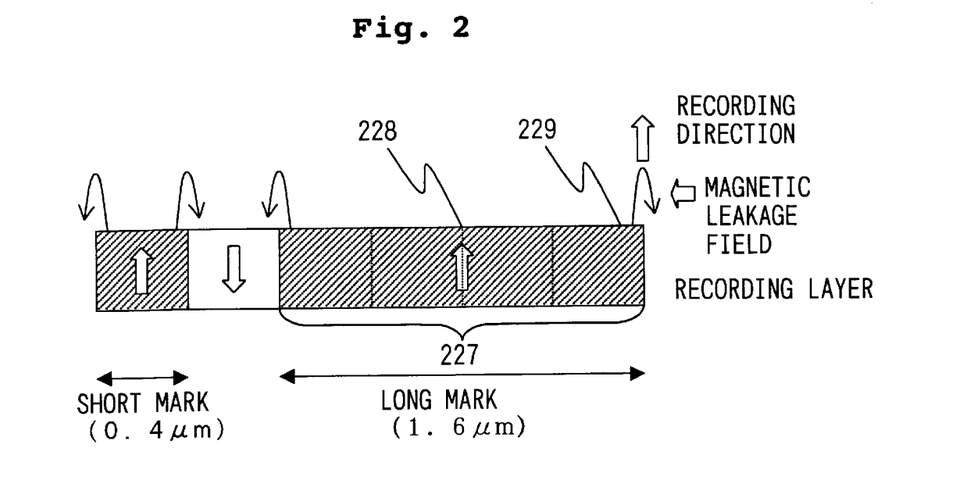
FIG. 2 is a conceptual view showing a cross section of magnetic marks formed in a recording layer by the conventional recording method and the manner in which magnetic leakage fields leak from the marks.

The MSR and MAMMOS involve utilizing the magnetic leakage fields leaking from the recorded magnetic domains in the recording layer of a magneto-optical recording medium to transfer the information on this layer to the reproducing layer of the medium, and thereafter reading out the information from the reproducing layer. However, it has been found that, under such a method or system, if the recording layer of a magneto-optical recording medium includes a continuous recorded magnetic domain (record mark) 227 consisting of two or more bits of information as shown in FIG. 2, the signal reproduced from the domain 227 is unstable in comparison with that from a shortest recorded magnetic domain which is present independently in the recording layer. This is conceived to be due to the difference in magnitude between the magnetic leakage fields at end portions and a middle portion of a continuous record mark formed on the recording layer. In particular, the magnetic leakage field leaking from the middle portion is weaker than that leaking from each of the end portions. It is consequently difficult to transfer the information on a middle portion of a continuous record mark to the reproducing layer. Therefore, in order to reproduce the information from a shortest record mark and the information from a continuous record mark, it is necessary to strictly control the power of the reproducing magnetic field and the power of the reproducing light beam, causing the problem that the reproducing power margins become narrower.

Japanese Patent Application Laid-Open No. 2-101659 discloses a method of recording binary information by pairing minimum record units and making the units of any pair different in magnetization. However, this Japanese publication does not show recording with a continuous recorded magnetic domain divided into magnetic domains magnetized in alternate directions.

SUMMARY OF THE INVENTION

In view of the problems with the foregoing prior art, it is an object of the present invention to provide a recording method making it possible to form, on the recording layer (of a magneto-optical recording medium), record marks which can be transferred reliably or securely to the reproducing layer (of the medium) during reproduction of information regardless of mark lengths of the marks.

It is another object of the invention to provide a recorder which can record continuous record marks having stable reproducing characteristics on the recording layer of a magneto-optical recording medium.

In accordance with a first aspect of the invention, a recording method is provided for recording information on a magneto-optical recording medium by radiating a recording light beam onto the medium while applying a magnetic field in a recording direction to the medium, the method comprising:

assigning one bit of information to a combination of a magnetic domain magnetized in the recording direction and a magnetic domain magnetized in the direction opposite to the recording direction, or to a combination of two magnetic domains magnetized in the direction opposite to the recording direction; and adjusting sizes of the domains in such a manner that, when two or more bits of information each corresponding to the combination of the magnetic domain magnetized in the recording direction and the magnetic domain magnetized in the opposite direction are recorded in series, the domain magnetized in the recording direction for the first bit of the two or more bits is shorter than the domain magnetized in the recording direction for a bit contained in other bits than the first bit of the two or more bits.

A conventional method for recording information on a magneto-optical recording medium involves magnetizing the recording layer of the medium in one direction (initializing direction), and reversing the direction of magnetization of a magnetic domain in the recording layer, depending on whether the information is either binary "0" or binary "1". If record information is defined as binary "1", a long magnetic mark 227 as shown in FIG. 2 will be formed on the recording layer for a series of two or more bits of record data, such as "1111". As stated above in the description of the related art section, there is a difference in strength between the magnetic leakage fields at a middle portion 228 and end portions 229 of the long mark 227. This results in a difference between the optimum power for reproducing the information positioned in the middle portion 228 and the optimum power for reproducing the information positioned in the end portions 229 or the information of a shortest mark existing independently on the recording layer. It is therefore difficult to reproduce information with the same reproducing power.

Figure 3:
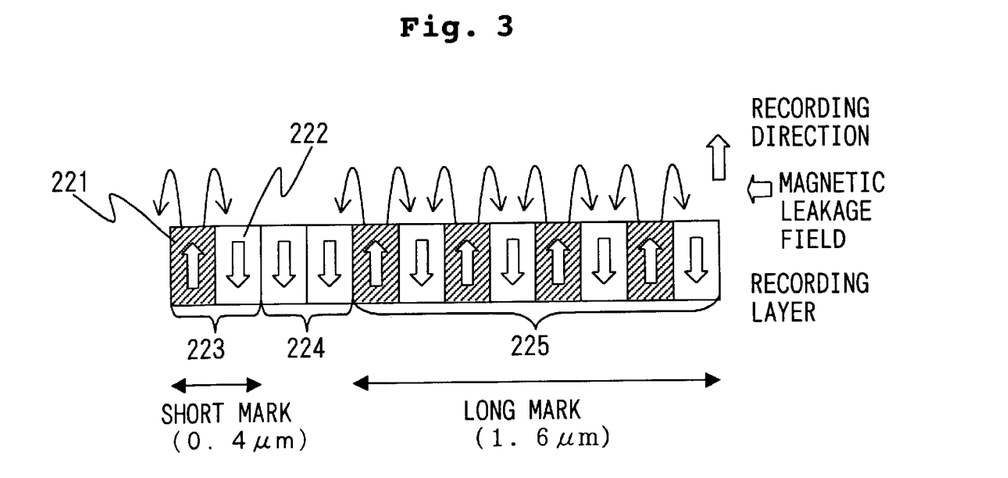
FIG. 3 is a conceptual view showing a cross section of magnetic marks formed in a recording layer by a recording method according to the invention and the manner in which magnetic leakage fields leak from the marks.

As shown in FIG. 3, the recording method according to the invention includes assigning one of binary "1" and binary "0" (for example, "1") to a combination of a magnetic domain 221 magnetized in the recording direction (upward in FIG. 3) and a magnetic domain 222 magnetized in the opposite direction (downward in FIG. 3), like a pattern of magnetic domains 223, and assigning the other of binary "1" and binary "0" (for example, "0") to a combination of two magnetic domains magnetized in the direction opposite to the recording direction, like a pattern of magnetic domains 224.

Figure 4:
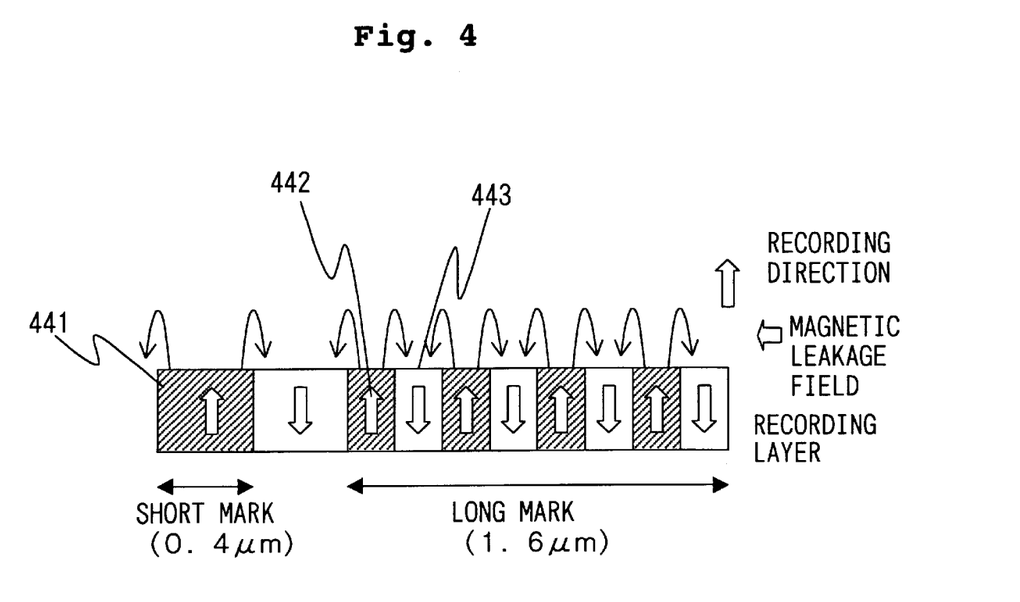
FIG. 4 is a conceptual view showing the manner in which a continuous magnetic mark is formed as divided by a recording method according to the invention and the manner in which magnetic leakage fields leak from the divided mark.

The recording direction represents one of the upward and downward directions perpendicular to the surfaces of the recording layer of a magneto-optical recording medium. Herein, for convenience, the recording direction is defined as the upward direction as shown in FIGS. 2–4. Herein, for convenience, an "↑ magnetic domain" represents a magnetic domain magnetized in the recording direction, while a "↓ magnetic domain" represents a magnetic domain magnetized in the opposite direction (initializing or erasing direction). Herein, for convenience, binary "1" represents record information.

Under the recording method according to the first aspect of the invention, a piece of continuous record information, such as "1111", is formed as a domain pattern consisting of one or more ↑ magnetic domains and one or more ↓ magnetic domains ("↑ ↓ ↑ ↓ ↑ ↓ ↑ ↓"). In other words, even in the case of a piece of continuous record information being recorded, the or every (minute) magnetic domain magnetized in the recording direction adjoins the or a magnetic domain magnetized in the opposite direction. Consequently, whatever domain pattern includes magnetic domains corresponding to record information, the magnetic leakage fields leaking from these domains are equal in magnitude. Therefore, independent of the length of the continuous record information, it is possible to stably transfer the magnetizing information on the recording layer to the reproducing layer. Herein, one bit is a minimum unit of binary information, which may be a train of binary data "1" and "0". Herein, the reproduction of information involves reading out bits of binary information one by one.

Figure 9:
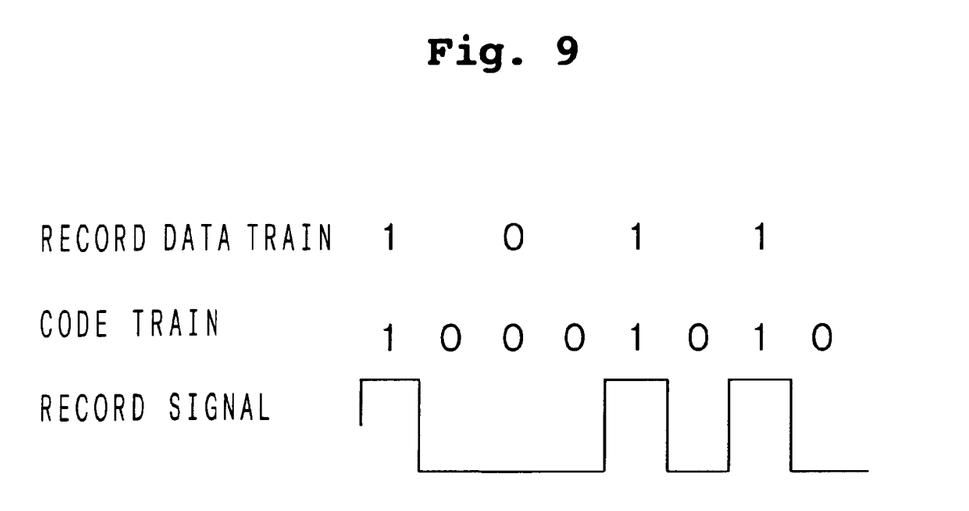
FIG. 9 is a view for use in explaining a summary of a recording method according to the invention, showing the relations among record data, the code train into which the data are converted, and the signal based on the train.

Under the recording method according to the invention, the recordation of information on the recording layer (of the recording medium) may involve converting each bit of binary information "1" into a train of codes "10", converting each bit of binary information "0" into a train of codes "00", and modulating at least one of the recording light beam and the recording magnetic field with the code trains. Specifically, record data bits "1011" may be converted into a code train "10001010", which may be the basis for generating a record signal having a waveform as shown in FIG. 9. The magnetic field may be modulated with the record signal and applied.

In this invention, L1 is defined as the length of the ↑ magnetic domain, which is magnetized in the recording direction, for each bit of record information. On the other hand, L2 is defined as the length of the ↓ magnetic domain, which is magnetized in the opposite direction, for each bit of record information. It is preferable that the ratio L2/L1 range between 0.1 and 0.9. Herein, the length of a magnetic domain means the circumferential length of the domain in the direction of the track of the recording medium. If the ratio of the length L2 of the ↓ magnetic domain to the length L1 of the ↑ magnetic domain is 0.1 or higher, it is possible to stably generate magnetic leakage fields from the domains. If this ratio L2/L1 is 0.9 or lower, it is possible to obtain stable reproducing characteristics when continuous record information is recorded.

In general, the magnitude of the magnetic leakage field leaking from an ↑ magnetic domain depends on the sizes of this domain and the magnetic domain or domains adjoining it. Consequently, the magnetic leakage field leaking from the ↑ magnetic domain for the first bit of a piece of record information is greater in magnitude, due to the two ↓ magnetic domains adjoining to this domain, than the magnetic leakage field leaking from the ↑ magnetic domain for the second bit of the information. Therefore, when two or more bits of continuous record information are recorded, it is preferable that the sizes of the magnetic domains be adjusted in such a manner that the ↑ magnetic domain for the first bit of the information is shorter than the ↓ magnetic domain or domains for the other bit or bits, in order that the magnetic leakage fields leaking from the magnetic domains for the first and the other bits are uniform or equal.

In accordance with a second aspect of the invention, a recording method is provided for recording information on a magneto-optical recording medium by radiating a recording light beam onto a recording layer of the medium while applying a magnetic field in a recording direction to the layer, the method comprising:

modulating at least one of the recording light beam and the recording magnetic field in such a manner that an area of the recording layer which represents one bit of binary information which is one of "1" and "0" consists of a magnetic domain magnetized in the recording direction and a magnetic domain magnetized in the direction opposite to the recording direction, and in such a manner that an area of the recording layer which represents one bit of binary information which is the other of "1" and "0" consists of two magnetic domains magnetized in the direction opposite to the recording direction; and adjusting sizes of recorded magnetic domains in such a manner that, when the magnetic domain magnetized in the recording direction has a length L1 while the magnetic domain magnetized in the opposite direction has a length L2, the ratio L2/L1 ranges between 0.1 and 0.9.

Under the recording method according to the second aspect of the invention, at least one of the recording light beam and the recording magnetic field is modulated in such a manner that the area representing a bit of binary information "1" is formed as a domain pattern ("↑ ↓ ") consisting of an ↑ magnetic domain and a ↓ magnetic domain, and that the area representing a bit of binary information "0" is formed as a domain pattern ("↓ ↓ ") consisting of two ↓ magnetic domains. L1 may represent the length of the magnetic domain magnetized in the recording direction (↑ magnetic domain) out of the two domains (↑ magnetic domain and ↓ magnetic domain) forming one bit of record information, while L2 may represent the length of the magnetic domain magnetized in the opposite direction (↓ magnetic domain) out of the two domains. The ratio L2/L1 is adjusted to range between 0.1 and 0.9. Consequently, even if a piece of continuous record information is formed on the recording layer, it is possible to stably transfer the magnetizing information on the recording layer to the reproducing layer, independent of the length of the continuous record information, as substantially stated above in the description of the first aspect of the invention.

In accordance with a third aspect of the invention, a recording method is provided for recording information by forming magnetic domains magnetized in different directions in a recording layer of a magneto-optical recording medium, the method comprising:

assigning one of binary "1" and binary "0" to a domain train consisting of two magnetic domains magnetized in opposite directions;

assigning the other of binary "1 " and binary "0" to a domain train consisting of two magnetic domains magnetized in the same direction; and recording information in such a manner that the ratio in length of one of the two magnetic domains magnetized in opposite directions to the other ranges between 0.1 and 0.9.

Under the recording method according to the third aspect of the invention, the domain train consisting of two magnetic domains magnetized in opposite directions is assigned to one of binary "1" and binary "0", which may be "1", while the domain train consisting of two magnetic domains magnetized in the same direction is assigned to the other of binary "1" and binary "0", which may be "0". For example, an ↑ magnetic domain may represent a magnetic domain magnetized in a recording direction, while a ↓ magnetic domain may represent a magnetic domain magnetized in the direction opposite to the recording direction. In this case, a domain train ↑ ↓ consisting of an ↑ magnetic domain and a ↓ magnetic domain is assigned to binary "1", while a domain train ↓ ↓ consisting of two ↓ magnetic domains is assigned to binary "0". The ratio in length of one of the two magnetic domains magnetized in opposite directions to the other is adjusted to range between 0.1 and 0.9. In the first aspect of the invention, binary "1" may correspond to one of the bits of binary information, while binary "0" may correspond to the other. This results in similar effects being obtained in the first and third aspects.

In accordance with a fourth aspect of the invention, a recording method is provided for recording information on a recording layer of a magneto-optical recording medium by radiating a recording light beam onto the medium while applying a magnetic field in a recording direction to the medium, the method comprising:

recording two or more consecutive bits of record information on the recording layer in such a manner that at least one bit of the consecutive bits is composed of a magnetic domain magnetized in the recording direction and a magnetic domain magnetized in the direction opposite to the recording direction.

In accordance with a fifth aspect of the invention, a recording method is provided for recording information on a recording layer of a magneto-optical recording medium by radiating a recording light beam onto the medium while applying a magnetic field in a recording direction to the medium, the method comprising:

modulating at least one of the recording magnetic field and the recording light beam in such a manner that, when two or more consecutive bits of record information are recorded, a magnetic domain magnetized in the direction opposite to the recording direction is formed in a recording area of the recording layer which corresponds to one bit of record information.

Under the recording methods according to the fourth and fifth aspects of the invention, as shown in FIG. 4, the recordation of a bit of single record information involves forming this information as only an isolated recorded magnetic domain 441 magnetized in the recording direction. As also shown in FIG. 4, the recordation of two or more consecutive bits of record information involves forming each of them as a recorded magnetic domain 442 magnetized in the recording direction and a recorded magnetic domain 443 magnetized in the opposite direction. This makes it possible to obtain uniform magnetic leakage fields even from the continuous record information, independent of the positions of the magnetic domains forming this information. Therefore, the reproducing power margin is not narrowed due to the length of the consecutive recorded magnetic domains.

In accordance with a sixth aspect of the invention, a recorder is provided for recording information on a magneto-optical recording medium, the recorder comprising:

a light source which irradiates the recording medium with a recording light beam;

a magnetic field applying device which applies a recording magnetic field; and a modulator for modulating record data represented by a data train with a data bit in a recording direction and/or a data bit in the direction opposite to the recording direction, in such a manner that a data bit in the direction opposite to the recording direction is interposed between the bits of the train;

the modulator outputting a signal with which to modulate at least one of the recording light beam and the recording magnetic field.

Thus, if record data are represented by a data train consisting of a data bit "1" in the recording direction and a data bit "0" in the opposite direction, the modulator of the recorder according to the invention modulates the data in such a manner that a data bit in the direction opposite to the recording direction is interposed between the bits of the train. The record data are recorded with at least one of the recording light beam and magnetic field modulated with the modulated data. In other words, it is possible to convert the data bit "1" as record information into a code train "10", convert each data bit "0" into a code train "00", and modulate at least one of the recording light beam and the recording magnetic field with the code trains. By using this recorder, it is possible to implement the recording methods according to the first to fifth aspects of the invention, enabling uniform magnetic leakage fields to be generated independent of the length of the continuous record information and the positions of the recorded magnetic domains. Therefore, the recorder according to the invention is suitable for recording on a magneto-optical recording medium including a recording layer and a reproducing layer to which the magnetizing information on the recording layer can be transferred.

In accordance with a seventh aspect of the invention, a recording method is provided for recording information on a magneto-optical recording medium including a recording layer by radiating a recording light beam onto the medium while applying a magnetic field in a recording direction to the medium, the method comprising:

recording two or more consecutive bits of record information in such a manner that a recording area of the recording layer which corresponds to the consecutive bits of record information includes at least a magnetic domain magnetized in the direction opposite to the recording direction.

The recording method according to the seventh aspect of the invention involves recording a piece of continuous information, which is a train of magnetic domains (or continuous record mark), by dividing the continuous record mark in such a manner that the mark includes at least one magnetic domain (or record mark) magnetized in the direction opposite to the direction in which the domain train is magnetized. In order for a continuous record mark representing two or more consecutive bits of record information to include a magnetic domain magnetized in the opposite direction, for example, the record signal based on the record information may be modulated. The (mark) length of the magnetic domain out of the consecutive magnetic domains which is magnetized in the opposite direction is not limited to the length of one bit, but may be any length.

In accordance with an eighth aspect of the invention, a recording method is provided for recording information on a recording layer of a magneto-optical recording medium by radiating a recording light beam onto the medium while applying a magnetic field in a recording direction to the medium, the method comprising:

applying a magnetic field having a magnetic field strength H1 in the recording direction when recording a record mark having a mark length A on the recording layer;

applying a magnetic field having a magnetic field strength H2 (H2≠H1) in the recording direction when recording a record mark having a mark length B (B≠A) on the recording layer.

The recording method according to the eighth aspect of the invention involves modulating the magnetic field strength of a recording magnetic field with the length of a record mark for formation in the recording layer. Specifically, the recording magnetic field having the magnetic field strength H1 is applied when the record mark having the mark length A is recorded, and the recording magnetic field having the magnetic field strength H2, which differs from the strength H1, is applied when the record mark having the mark length B is recorded. For example, if the record mark having the mark length A is a shortest record mark, the mark is formed in the recording layer by applying the recording magnetic field having the magnetic field strength HI which is the same as conventionally. The record mark having the mark length B (a continuous record mark) is formed in the recording layer by applying the recording magnetic field having the magnetic field strength H2 which is lower than the strength H1. The record mark having the mark length B and recorded with the lower magnetic field strength is a mixture of magnetic domains in the recording and opposite directions (that is, the magnetic domains in the recording direction are distributed). It is possible to obtain magnetic leakage fields with sufficient magnetic field strength anywhere from a mixture of magnetic domains in the recording and opposite directions. This makes it possible to obtain sufficient magnetic leakage fields from a middle portion as well as the front and rear edges of a continuous record mark. Consequently, the magnetic leakage fields can be uniform over the entire continuous record mark.

DESCRIPTION OF PREFERRED EMBODIMENTS OF THE INVENTION

Embodiments and examples of recording methods and a recorder according to the present invention will be described below with reference to the drawings, but the invention is not limited to them.

Embodiment 1

Figure 1:
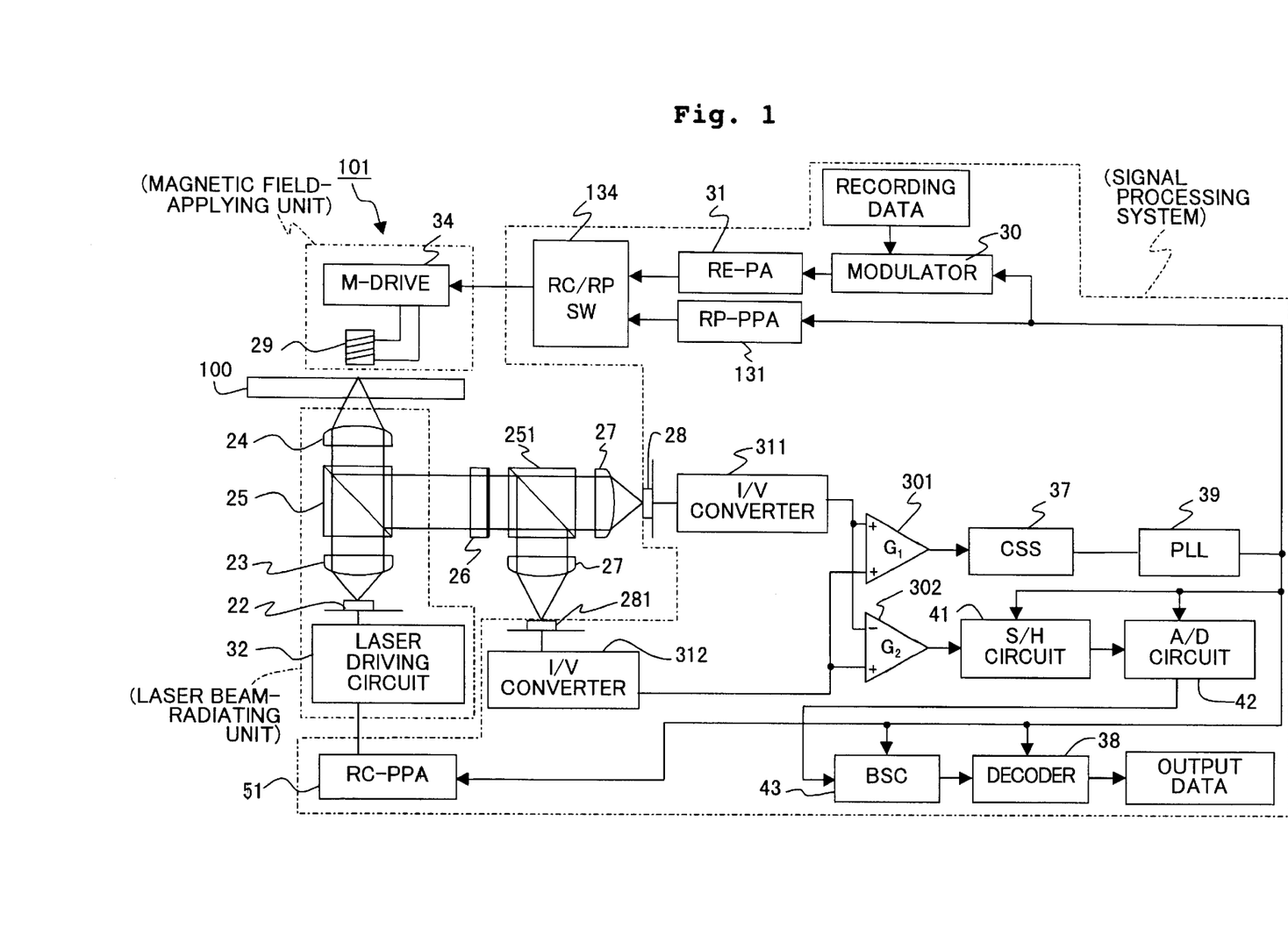
FIG. 1 is a schematic view showing the structure of a recorder according to the present invention.

FIG. 1 schematically shows the structure of a recorder according to the invention. The recorder 101 consists mainly of a laser beam radiating unit for irradiating a magneto-optical recording medium 100 with a light beam pulsed in synchronism with coded data, a magnetic field applying unit for applying a controlled magnetic field to the recording medium 100 during recordation and reproduction, and a signal processing system for detecting and processing a signal from the recording medium 100. The laser beam radiating unit includes a laser 22, which is connected to a laser driving circuit 32 and a recording pulse width/phase adjusting circuit (RC-PPA) 51. The driving circuit 32 receives a signal from the adjusting circuit 51, and controls the laser pulse width and phase of the laser 22. The adjusting circuit 51 receives a clock signal, which will be described later on, from a PLL circuit 39, and generates a first synchronizing signal for adjusting the phase and pulse width of a recording light beam.

The magnetic field applying unit includes a magnetic coil 29 for applying a magnetic field, which is connected to a magnetic coil driving circuit (M-DRIVE) 34. During recordation, the driving circuit 34 receives coded data via a phasing (phase adjusting) circuit (RE-PA) 31 from a modulator 30 for converting record data into predetermined codes, and controls the magnetic coil 29. During reproduction, the driving circuit 34 receives the clock signal, which will be described later on, from the PLL circuit 39, generates a second synchronizing signal for phase and pulse width adjustment via a reproducing pulse width/phase adjusting circuit (RP-PPA) 131, and controls the magnetic coil 29 on the basis of the second synchronizing signal. In order to switch the signal to be input into the driving circuit 34 between recordation and reproduction, a recordation/reproduction changeover switch (RC/RP SW) 134 is connected to the driving circuit 34.

The signal processing system includes a first polarizing prism 25, which is position ed between the laser 22 and magneto-optical recording medium 100. A second polarizing prism 251 and detectors 28 and 281 are arranged on one side of the first prism 25. Both detectors 28 and 281 are connected to a subtracter 302 and an adder 301 via I/V converters 311 and 312, respectively. The adder 301 is connected to the PLL circuit 39 via a clock extracting circuit (CSS) 37. The subtracter 302 is connected to a decoder 38 via a sample-and-hold (S/H) circuit 41 for holding a signal in synchronism with the clock, an A/D conversion circuit 42 for analog-digital conversion in synchronism with the clock in the same manner as described above, and a binary coded signal processing circuit (BSC) 43.

A light beam emitted from the laser 22 is converted into parallel rays by a collimator lens 23. The parallel rays pass through the polarizing prism 25, and are condensed by an objective lens 24 onto the magneto-optical recording medium 100. A light beam reflected by the disk 100 is directed toward the polarizing prism 251 by the polarizing prism 25, passes through a half-wavelength plate 26, and is then divided into two beams in different directions by the polarizing prism 251. The two beams are each condensed by a detecting lens 27 onto a photodetector 28 or 281. The recording medium 100 has pits formed for generating a tracking error signal and a clock signal. After the detectors 28 and 281 detect signals which represent light beams reflected from the pits for generating the clock signal, the clock extracting circuit 37 extracts the signals. Thereafter, a data channel clock is generated by the PLL circuit 39, which is connected to the extracting circuit 37.

Upon data recordation, the laser 22 is modulated at a constant frequency by the laser driving circuit 32 to have a period which is half (½) of the period of the data channel clock, and radiates serial narrow pulses of a light beam, heating the data recording area of the rotating magneto-optical recording medium 100 locally at regular intervals. The modulator 30 of the magnetic field applying unit is controlled with the data channel clock to generate a data signal having a reference clock period. The modulator 30 modulates or codes record data. For example, "1"and "0" of the record data will be coded as "10" and "00", respectively. The modulator 30 modulates the record data so that the coded data are sent at the period which is ½ of that of the data channel clock to the phasing circuit 31. After "1" or "0" of a coded data signal is sent to the adjusting circuit 31, where its phase is adjusted, it is sent to the magnetic coil driver 34. In particular, there may be a train or series of record data "1" such as "111". The coded data signal "10" corresponding to the first record datum "1" of the train is phased by the phasing circuit 31 so that "1" and "0" are synchronous. The coded data signal "10" corresponding to the second record datum "1" of the train is phased by the phasing circuit 31 so that "1" and "0" of this signal "10" correspond to ¾ and ¼, respectively, of the period of the data channel clock. The magnetic coil driver 34 controls the magnetic coil 29 so as to apply a magnetic field of the polarity corresponding to a coded data signal to a heated portion in the data recording area of the recording medium 100.

Figure 5:
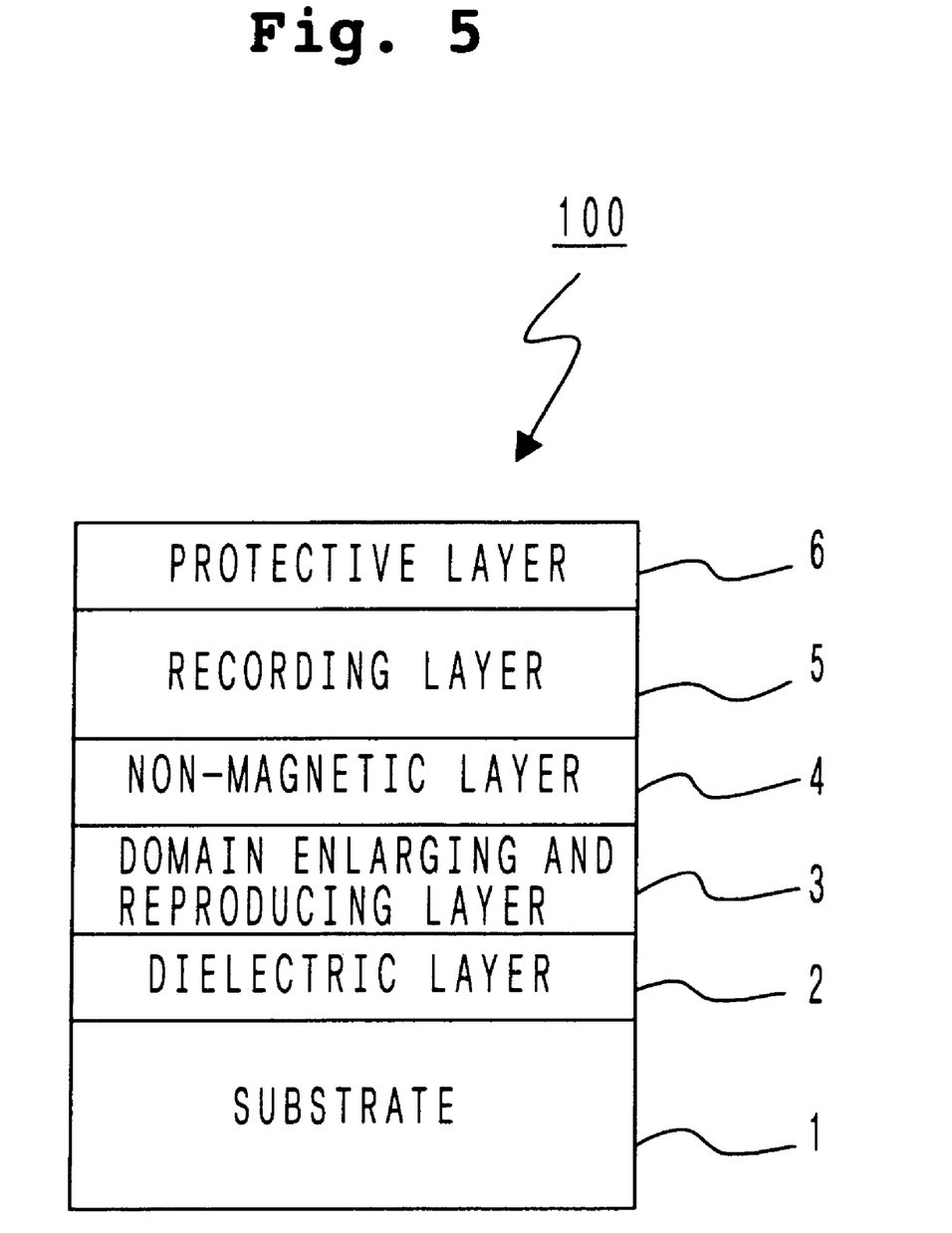
FIG. 5 is a view showing a cross section of a magneto-optical recording medium made in an embodiment.

FIG. 5 shows schematically in cross section a magneto-optical recording medium 100, on which the recorder 101 can record information. The recording medium 100 is a magneto-optical recording medium for the MAMMOS (magnetic amplifying magneto-optical system), and includes a dielectric layer 2, a domain enlarging and reproducing layer 3, a non-magnetic layer 4, a recording layer 5 and a protective layer 6 which are stacked or laminated in order on a transparent substrate 1. It is possible to enlarge a minute recorded magnetic domain of the recording layer of a magneto-optical recording medium of such structure by transferring the domain to the domain enlarging and reproducing layer while applying a reproducing magnetic field on the principle of the MAMMOS (magnetic amplifying magneto-optical system) invented by the applicant. The principle of the MAMMOS is disclosed in detail in International Publication No. WO98/02878, which is referred to in the description of the related art section, and the disclosure of which is incorporated herein by reference.

With reference to FIG. 5, the transparent substrate 1 may be made of transparent resinous material such as polycarbonate or amorphous polyolefine formed in a desired shape, or be a glass plate formed in a desired shape, with a transparent resin film adhering to one side of the plate, the film having a desired preformatted pattern transferred to it. The transparent substrate 1 may be any other substrate which transmits light. The dielectric layer 2 is provided so that reproducing light beams make multiple interference in film to substantially increase the detected Kerr rotation angle. The dielectric layer 2 may be made of material having a greater refractive index than the transparent substrate 1. This material may be an inorganic dielectric made of SiN.

The protective layer 6 protects the films 3–5 between the transparent substrate 1 and protective layer 6 from corrosion and other chemical harmful influences, and may be an SiN film or a carbon film. The recording layer 5 is a vertically magnetizable film which is vertically magnetically anisotropic at room temperature or a higher temperature. The recording layer 5 should most preferably be an amorphous alloy of transition metal and rare earth such as TbFeCo, DyFeCo or TbDyFeCo, but may be made of other known magneto-optical recording material such as an alternate laminate (alternately layered product) of Pt film and Co film or a magnetic substance of garnet oxide. The non-magnetic layer 4 may be a dielectric such as $SiO_2$, AlN or SiN, or a metal such as Al, AlTi, Au, Cu, AuAl or AgAl, or a laminate of such a metal and such a dielectric. The domain enlarging and reproducing layer 3 is a vertically magnetizable film which magnetizes vertically at room temperature or a higher temperature. This layer 3 may be made of GdFeCo or other magnetic material which increases the Kerr rotation angle at the highest temperature of the medium being irradiated with a reproducing light beam, to obtain a better regenerative signal during reproduction.

The dielectric layer 2, domain enlarging and reproducing layer 3, non-magnetic layer 4, recording layer 5 and protective layer 6 may be formed by a dry process such as continuous spattering by means of a magnetron spattering apparatus.

Figure 6:
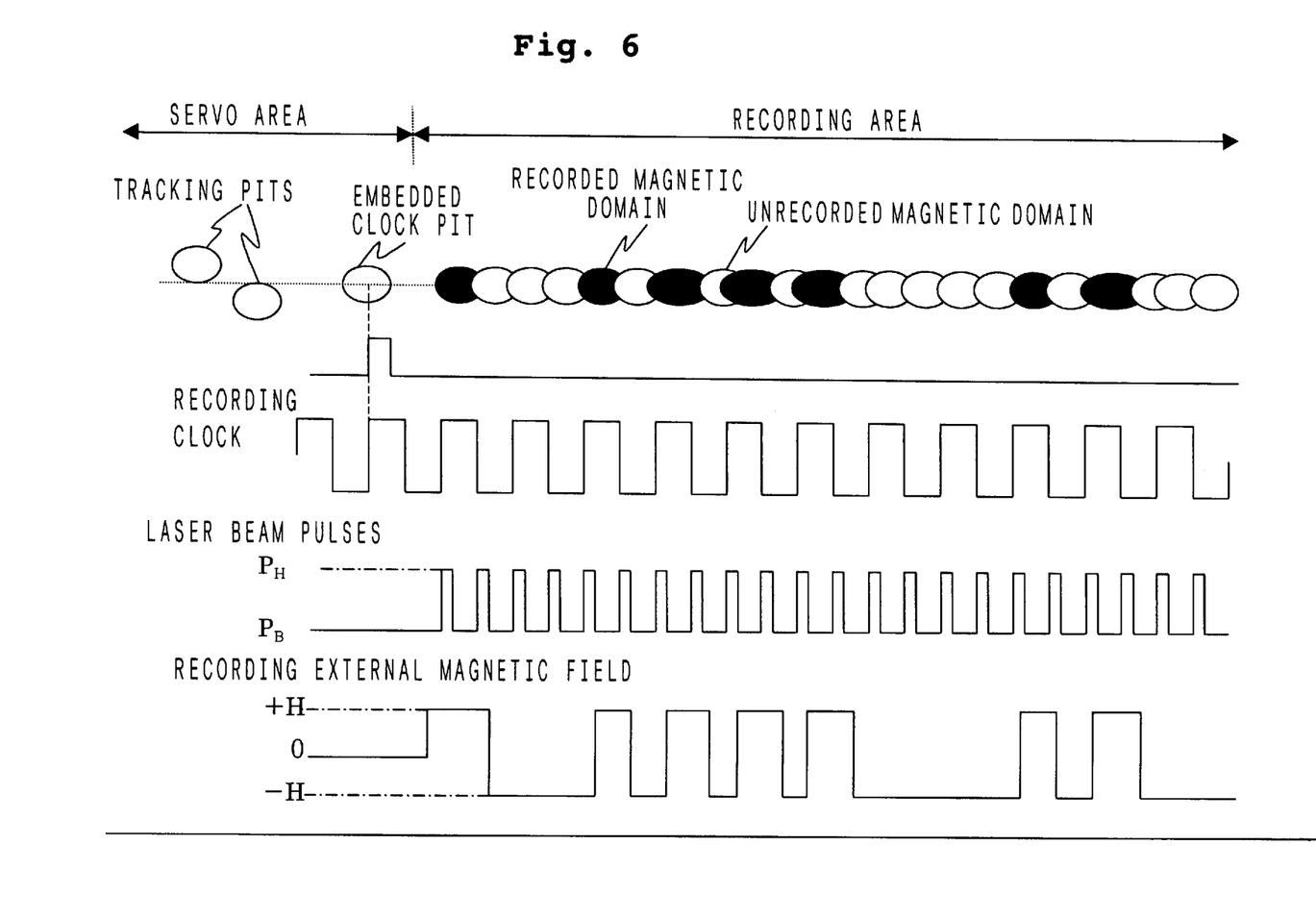
FIG. 6 is a timing chart showing the relations among recording laser beam pulses, a recording external magnetic field and recorded magnetic domains for a recording method according to the invention.

A magneto-optical recording medium 100 constructed as stated above was loaded into a recorder 101 in such a manner that a laser beam was radiated to the side of the medium which is adjacent to the substrate 1. Then, information was recorded on the recording medium 100. The laser wavelength of the optical head of the recorder 101 was 680 nm. The numerical aperture NA of the objective lens of the recorder 101 was 0.55. The data was recorded at a linear velocity of 2.5 m/sec and a laser beam pulse duty of 30% by the optical pulse magnetic field modulation recordation method for recording by modulating at ±200 (Oe) an external magnetic field modulated into predetermined coded data signals by the modulator while radiating a laser beam in the form of pulses of a constant period. FIG. 6 is a timing chart of the recording laser beam pulses and the recording external magnetic field with respect to the recording clock. FIG. 6 shows, near its top, a pattern of minute recorded magnetic domains formed by this method. The magnetic domains represented by black circles correspond to "1" of the foregoing coded data signals, and their diameter was 0.2 micron. The magnetic domain as the first bit of each series of consecutive record data was 0.2 micron in diameter, while the other domains thereof were 0.3 micron in diameter.

Next, the information recorded as stated above on the magneto-optical recording medium was reproduced by a reproducer, which is not shown. During the reproduction of the information, the magnetic domains where the information had been recorded were irradiated one by one with a reproducing laser beam in synchronism with a reproducing clock, while a reproducing magnetic field modulated in pulsed form in synchronism with the reproducing clock was applied (to the domains one by one). The sample-and-hold timing of the reproduced signals was made coincident with the modulating timing of the magnetic field. With respect to patterns "1", "11" and "11111" of the recorded information (which correspond to lengths of 0.4 micron, 0.8 micron and 1.6 microns, respectively, as converted into mark length according to the conventional recording method), the ranges of reproduction where information can be reproduced were found out by varying the power of the reproducing laser beam and the power of the reproducing magnetic field. The results are shown in the graph of FIG. 7.

Figure 7:
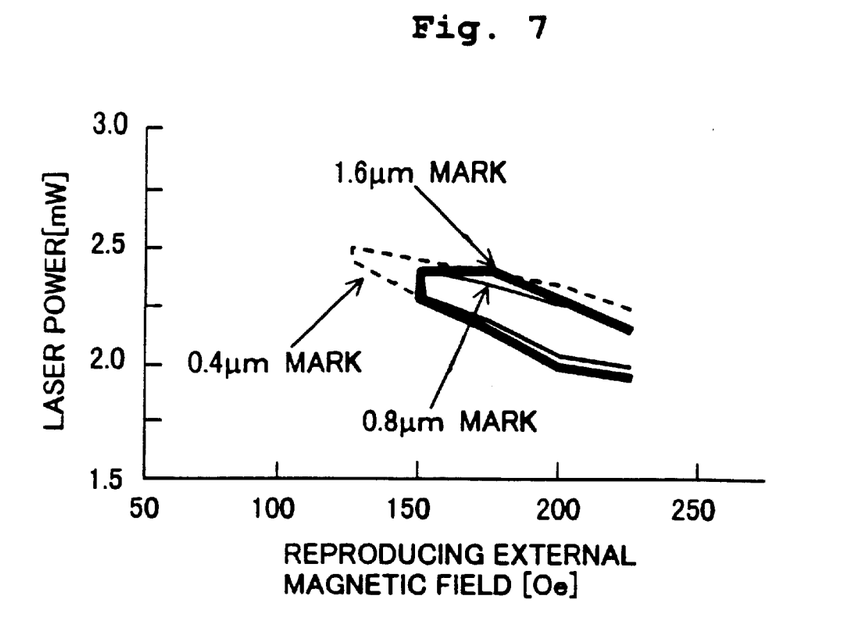
FIG. 7 is a graph showing the ranges of reproduction for record marks of various record patterns which are recorded by the recorder according to the invention.

The graph of FIG. 7 shows that the range of reproduction where all record patterns (record mark lengths) of the recorded information can be reproduced is very wide, and that the reproducing power margins are very wide. Therefore, it is possible to stably reproduce even various record patterns of information recorded by the recorder according to the invention.

Comparative Example

Figure 8:
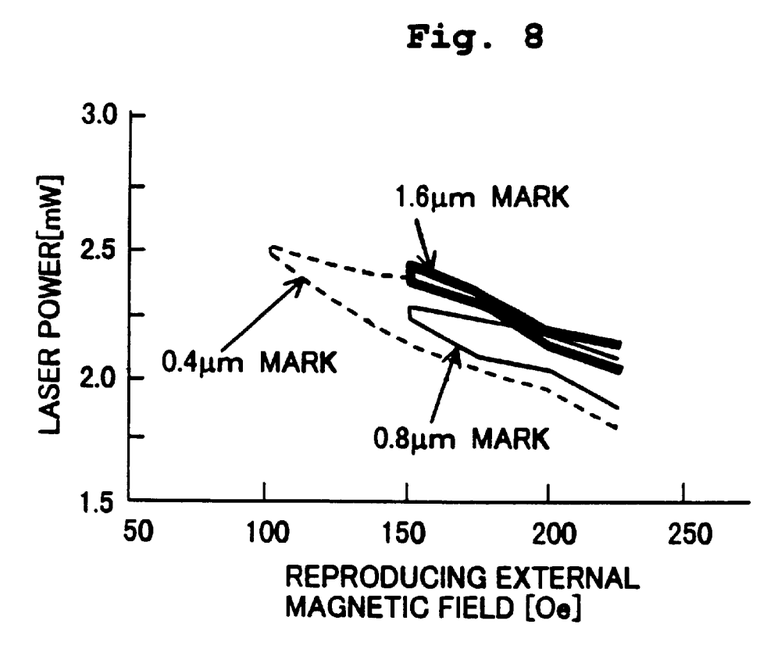
FIG. 8 is a graph showing the ranges of reproduction for record marks of various record patterns which are recorded by the conventional recording method.

The record patterns "1", "11" and "1111" of record information were recorded on a magneto-optical recording medium made in accordance with Embodiment 1, by a conventional method of forming a bit "1" of record information as a magnetic domain in the recording direction and a bit "0" of record information as a magnetic domain in the opposite direction. As a result, the record patterns "1", "11" and "1111" of record information were formed which were 0.4 micron, 0.8 micron and 1.6 microns, respectively, in mark length. The ranges of reproduction where information can be reproduced were found out by reproducing the pieces of record information of these mark lengths similarly to the embodiment. The results are shown in the graph of FIG. 8. As can be seen from this graph, the range of reproduction for the record pattern "1111" (1.6 microns in mark length) of record information is narrow and deviate toward higher power. The graph shows that the range where all the record marks having mark lengths of 0.4 micron, 0.8 micron and 1.6 microns can be reproduced is very little, and that the reproducing power margins are very narrow.

Embodiment 2

Figure 10:
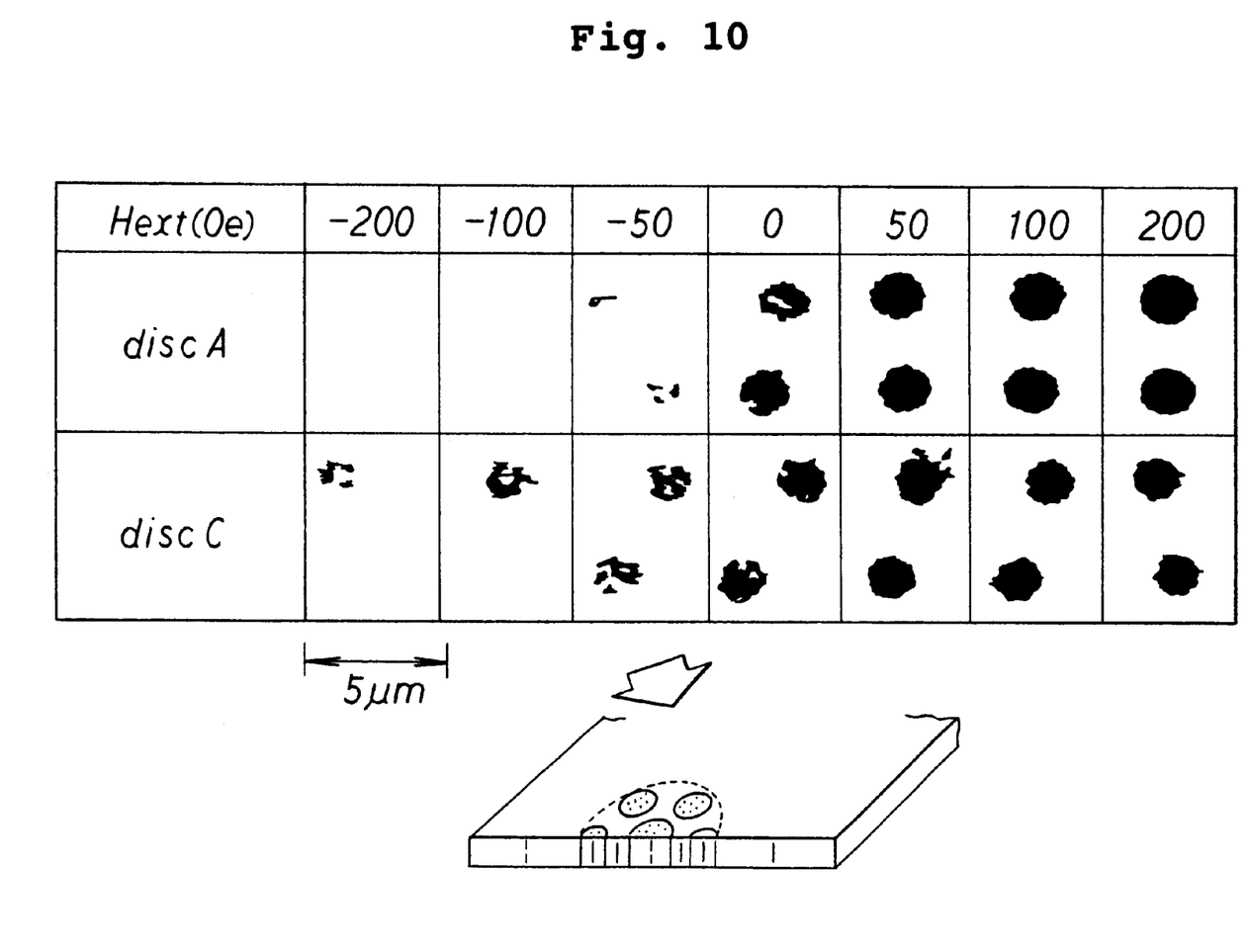
FIG. 10 is a view typically showing the manner in which the shapes of recorded magnetic domain formed in the recording layer of a magneto-optical recording medium depend on the strength of a recording magnetic field.

In this embodiment, a recording method according to the eighth aspect of the invention will be described in detail. FIG. 10 typically shows the dependency of recorded magnetic domain shapes of magneto-optical discs on recording magnetic field strength. In FIG. 10, a disc A is a magneto-optical recording medium including a substrate of polycarbonate, a layer of silicon nitride which is 60 nm in thickness, a recording layer of TbFeCo which is 8 nm in thickness, a recording auxiliary layer of $Pt_{84}Co_{16}$ which is 40 nm in thickness and a layer of silicon nitride which is 60 nm in thickness. The layers are stacked on the substrate. A disc B is a magneto-optical recording medium including a substrate of polycarbonate, a layer of silicon nitride which is 60 nm in thickness, a recording layer of TbFeCo which is 8 nm in thickness, a layer of silicon nitride which is 60 nm in thickness and a layer of Al alloy which is 50 nm in thickness.

Figure 11:
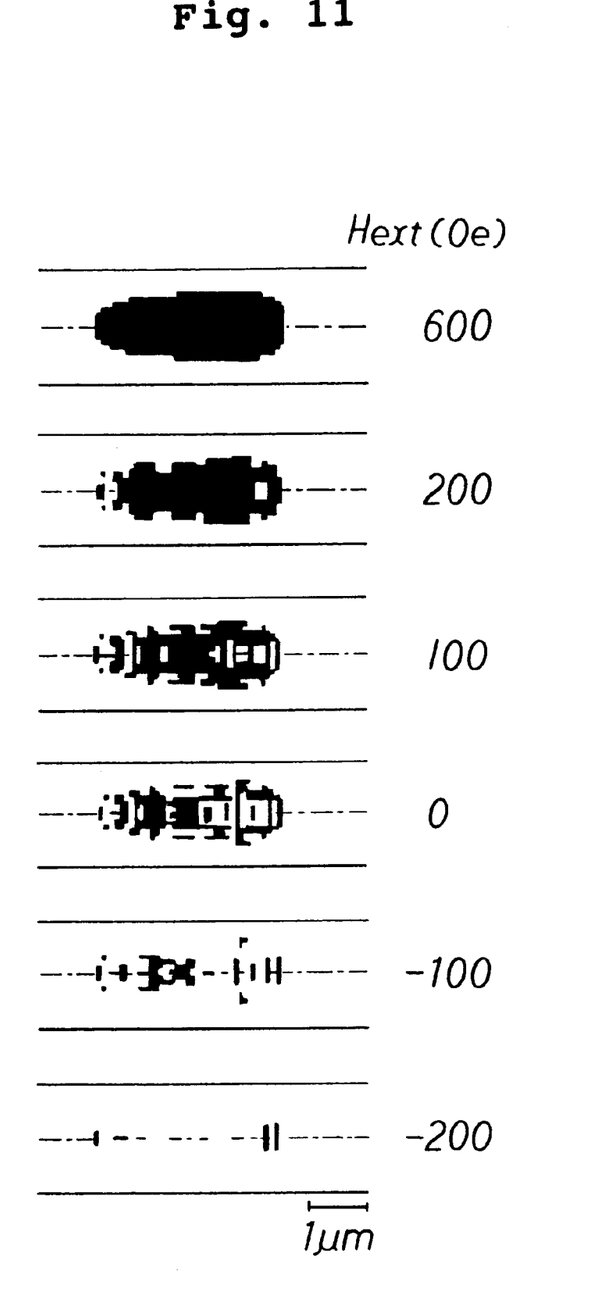
FIG. 11 is a view typically showing the results of a simulation of t he relations between the strength of a recording magnetic field and the manner in which magnetic domains form a continuous record mark.

The layers are stacked on the substrate. FIG. 10 includes, at its bottom, a conceptual view of recorded magnetic domains observed on the disc A or B. In this conceptual view, the broken line defines an area which is ready for recording (an area having reached the temperature at or above which information can be recorded). This area includes minute magnetic domains formed in it, which occupy part of it gradually as the recording magnetic filed becomes stronger. The table of FIG. 10 shows the condition in which minute magnetic domains occupy part of the foregoing area of each disc A or B with respect to the recording magnetic field. This table also shows the manner in which two tracks of recorded magnetic domains are formed on each of the discs. As can be seen from the disc A in FIG. 10, no recorded magnetic domain nor minute magnetic domain is formed if the recording magnetic field is small. On the disc B, if the recording magnetic field is −100 (Oe) (about 79,000 A/m), reversal of magnetization of minute magnetic domains occurs in the form of shot holes or the like within a recorded magnetic domain. If the recording magnetic field is increased, a larger number of minute magnetic domains are formed in a recorded magnetic domain. If a sufficient recording magnetic field is applied, minute magnetic domains aggregate or collect and form a solid recorded magnetic domain. Thus, if the magnetic field strength of the recording magnetic field applied to the recording layer is small, each of the formed recorded magnetic domains is a mixture of magnetic domains in the recording direction and magnetic domains in the opposite direction (that is, the magnetic domains in the recording direction are dispersive). Therefore, by weakening the strength of the magnetic field applied to the recording layer when forming a continuous record mark, it is possible to make the mark a mixture of magnetic domains in the recording and opposite directions. Sufficient magnetic leakage fields can be obtained anywhere from a mixture of magnetic domains in the recording and opposite directions. Consequently, the magnetic leakage field or fields leaking from a middle portion of the continuous record mark are greater than conventionally. This can be explained even with a simulation of magnetic domain formation in connection with magneto-optical recording as shown in FIG. 11. Similar recording can be made on a magneto-optical recording medium for the MAMMOS. The simulation of FIG. 11 typically represents the results of formation of continuous record marks having a mark length of 3 microns. In the simulation results of FIG. 11, the black areas consist of magnetic domains magnetized in the recording direction, while the white areas consist of magnetic domains magnetized in the opposite direction.

Figure 12A:
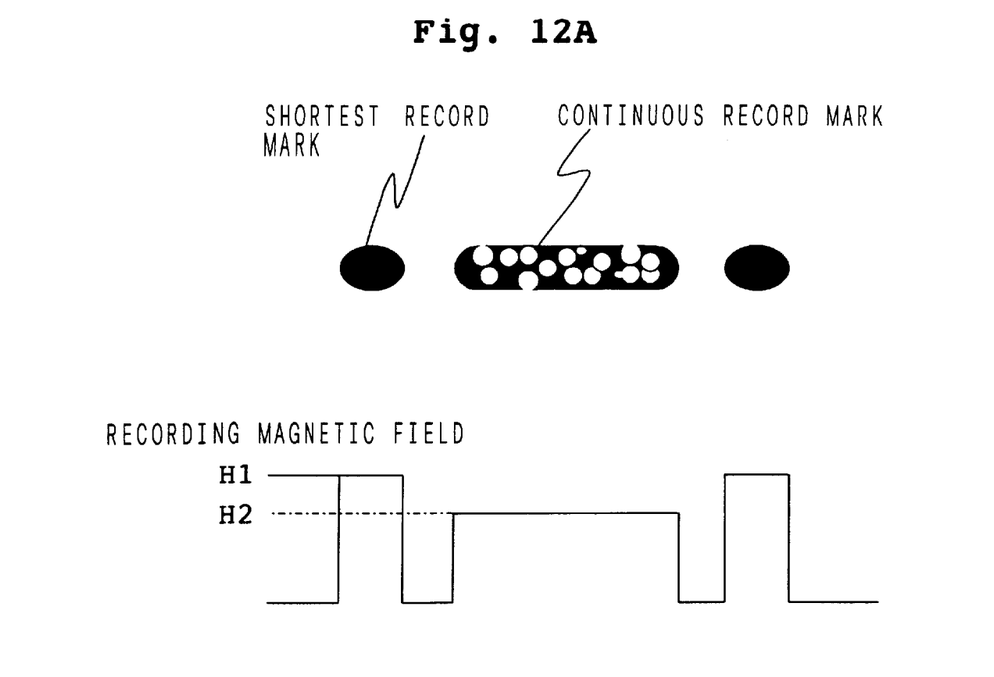
FIG. 12A is a timing chart showing how the magnetic field strength of a recording magnetic field is modulated with the lengths of record marks.
Figure 12B:
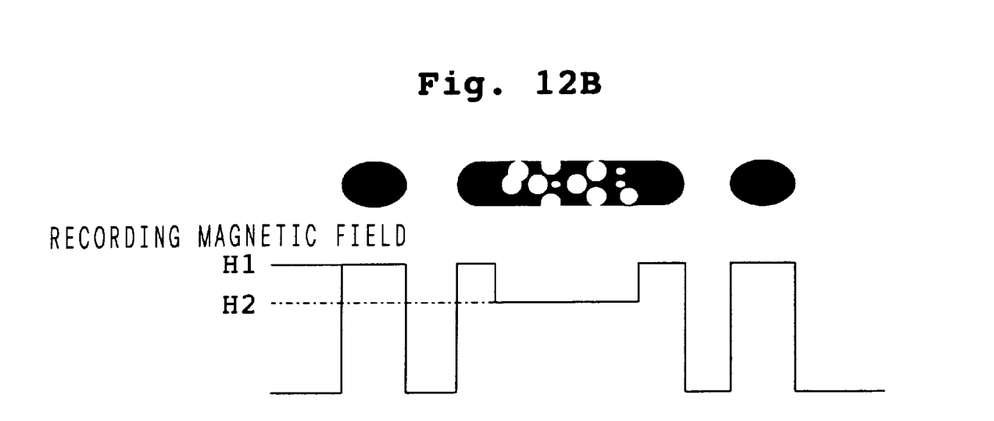
FIG. 12B shows an example where the magnetic field strength (of a recording magnetic field) is modulated step by step when a continuous record mark is formed.

The foregoing results are the basis for proving that it is possible to form a continuous record mark in the form of a mixture of magnetic domains in the recording and opposite directions by applying the recording magnetic field with magnetic field strength which differs from that for recording a shortest record mark. The recording method may be the magnetic field modulation recordation method or the optical pulse magnetic field modulation recordation method. For example, a recording magnetic field may be applied to a magneto-optical recording medium at timing as shown in FIG. 12A. In order that the outlines of edges of a continuous record mark may be striking, as shown in FIG. 12B, the recording magnetic field can be stronger when the mark edges are formed, and the magnetic field strength can be weaker for the other part of the mark. This can aggregate magnetic domains in the recording direction only at the edges of the record mark, and mix magnetic domains in the recording and opposite directions in a middle portion of the mark. As a result, it is possible to increase the magnetic leakage field leaking from the middle of the continuous record mark. Therefore, for example, when reproducing information from a magneto-optical recording medium for the MAMMOS which includes a domain enlarging and reproducing layer, it is possible to securely transfer the information in the middle of a continuous record mark to the domain enlarging and reproducing layer and enlarge the information. This greatly reduces reproducing errors when reproducing information from a middle portion of a continuous record mark.

It is known that, when information is reproduced from a magneto-optical recording medium for the MAMMOS, reproducing errors occur in a middle portion of a continuous record mark if the mark length of this mark is a predetermined value or greater. If a shortest mark is very short, and even if it is a continuous record mark, a sufficient magnetic leakage field can be obtained from its middle portion, and therefore information can be reproduced. Accordingly, reproducing errors can occur only in continuous record marks each having the predetermined length or a greater length. In such a case, information may be recorded with the magnetic field strength of the recording magnetic field varied only when a continuous record mark having a predetermined or greater length is formed.

The recording methods and recorder embodying the invention have been described hereinbefore, but the invention is not limited to them. For example, in the embodiment 1, the magneto-optical recording medium for recording information is a layered magneto-optical recording medium including a substrate, a dielectric layer, a reproducing layer, a non-magnetic layer, a recording layer and a protective layer in that order. Information was recorded on this recording medium, with a recording light beam radiated onto the side of the medium which is adjacent to the substrate. In an alternative embodiment, a layered magneto-optical recording medium includes a substrate, a dielectric layer, a recording layer, a non-magnetic layer, a reproducing layer and a protective layer in that order. Information can be recorded on this recording medium, with a recording light beam radiated onto the side of the medium which is adjacent to the protective layer.

In the embodiment 1, a magneto-optical recording medium for the MAMMOS was made. Alternatively, information may be recorded on a magneto-optical recording medium for the MSR. Otherwise, information may be recorded in accordance with the present invention on a magneto-optical recording medium as disclosed in W097/03439, W097/22969 and W098/09283, the disclosures of which are incorporated herein by reference.

In the embodiment 2, continuous record marks were formed on the recording layer, with the recording magnetic field controlled in such a manner that it was weaker in magnetic field strength than the magnetic filed for recording a shortest record mark. In an alternative embodiment, a continuous record mark is formed on the recording layer of a magneto-optical recording medium, with a recording light beam radiated onto the medium. Information is recorded on this recording medium, with the recording light beam controlled in such a manner that it is weaker in light intensity than the recording light beam for recording a shortest record mark.

By recording information by each of the recording methods according to the invention, as described hereinbefore, it is possible to obtain uniform magnetic leakage fields from the record marks corresponding to the respective pieces of record information, even if the record information is continuous. Therefore, these methods are very suitable as a method of recording information on a magneto-optical recording medium of such a type that magnetizing information recorded on its recording layer is transferred to its reproducing layer, from which the information is reproduced, as is the case with the MAMMOS and MSR.

By recording information by means of the recorder according to the invention, it is possible to transfer record information to the reproducing layer of a magneto-optical recording medium securely and stably independent of the record pattern, and to make the reproducing power margin wider than conventionally.

What is claimed is:

1. A recording method for recording information on a magneto-optical recording medium by radiating a recording light beam onto the medium while applying a magnetic field in a recording direction to the medium, the method comprising:
assigning one bit of information to a combination of a magnetic domain magnetized in the recording direction and a magnetic domain magnetized in the direction opposite to the recording direction, or to a combination of two magnetic domains magnetized in the direction opposite to the recording direction; and
adjusting sizes of the domains such that, when at least two bits of information each corresponding to the combination of the magnetic domain in magnetized in the recording direction and the magnetic domain magnetized in the opposite direction are recorded in series, the domain magnetized in the recording direction for the first bit of the at least two bits is shorter than the domain magnetized in the recording direction for a bit contained in bits other than the first bit of the at least two bits.

2. The recording method according to claim 1 wherein, when each of the magnetic domains magnetized in the recording direction has a length L1 and each of the magnetic domains magnetized in the opposite direction has a length L2, the ratio L2/L1 ranges between 0.1 and 0.9.

3. The recording method according to claim 1, wherein each of the recorded magnetic domains magnetized in the recording direction ranges in size between 0.01 micron and 0.36 micron.

4. A recording method for recording information on a magneto-optical recording medium by radiating a recording light beam onto a recording layer of the medium while applying a magnetic field in a recording direction to the layer, the method comprising:
modulating at least one of the recording light beam and the recording magnetic field such that an area of the recording layer which represents one bit of binary information which is the one of "1" and "0" consists of a magnetic domain magnetized in the recording direction and a magnetic domain magnetized in the direction opposite to the recording direction, and such that an area of the recording layer which represents one bit of binary information which is the one of "1" and "0" consists of two magnetic domains magnetized in the direction opposite to the recording direction; and
adjusting sizes of recorded magnetic domains such that, when the magnetic domain magnetized in the recording direction has a length L1 while the magnetic domain magnetized in the opposite direction has a length L2, the ratio L2/L1 ranges between 0.1 and 0.9.

5. The recording method according to claim 4, wherein the recorded magnetic domain magnetized in the recording direction ranges in size between 0.01 micron and 0.36 micron.

6. The recording method according to claim 4, wherein when at least two bits of binary information which are one of "1" and "0" and each of which consists of the magnetic domain magnetized in the recording direction and the magnetic domain magnetized in the opposite direction are recorded in series, the sizes of the magnetic domains are adjusted such that the domain included by the first bit of information and magnetized in the recording direction is shorter than the domain included by the other bit or each of the bits and magnetized in the recording direction.

7. A recording method for recording information by forming magnetic domains magnetized in different directions in a recording layer of a magneto-optical recording medium, the method comprising:
assigning one of binary "1" and binary "0" to a domain train consisting of two magnetic domains magnetized in opposite directions;
assigning the other of binary "1" and binary "0" to a domain train consisting of two magnetic domains magnetized in the same direction; and
recording information such that a ratio in length of one of the two magnetic domains magnetized in opposite directions to the other of the two magnetic domains magnetized in opposite directions ranges between 0.1 and 0.9.

8. A recording method comprising:
adjusting sizes of recorded magnetic domains such that, when at least two consecutive bits of information are recorded with domain trains each consisting of two magnetic domains magnetized in opposite directions, the recorded magnetic domain representing the first bit of the at least two consecutive bits is shorter than the recorded magnetic domain representing a bit contained in the bits other than the first bit of the at least two consecutive bits.

9. A recording method for recording information of a long record mark of at least two consecutive bits on a recording layer of a magneto-optical recording medium by radiating a recording light beam onto the medium while applying a magnetic field in a recording direction to the medium, the method comprising:
recording at least two consecutive bits of record information on the recording layer such that at least one of the bits consists of a magnetic domain magnetized in the recording direction and a magnetic domain magnetized in the direction opposite to the recording direction.

10. The recording method according to claim 9, wherein, when each of the magnetic domains magnetized in the recording direction has a length L1 and each of the magnetic domains magnetized in the opposite direction has a length L2, the ratio L2/L1 ranges between 0.1 and 0.9.

11. A recording method for recording information of a long record mark of at least two consecutive bits on a recording layer of a magneto-optical recording medium by radiating a recording light beam onto the medium while applying a magnetic field in a recording direction to the medium, the method comprising:
modulating at least one of the recording magnetic field and the recording light beam such that, when at least two consecutive bits of record information are recorded, a magnetic domain magnetized in the direction opposite to the recording direction is formed in a recording area of the recording layer which corresponds to one bit of record information.

12. The recording method according to claim 11, wherein the recorded magnetic domain magnetized in the recording direction in the recording area corresponding to one bit of record information ranges in size between 0.01 micron and 0.36 micron.

13. The recording method according to claim 11, wherein the magneto-optical recording medium includes a recording layer and a reproducing layer, and that magnetizing information in the recording layer is transferred to the reproducing layer, from which information is reproduced.

14. A recorder for recording information of a long record mark of at least two consecutive bits on a magneto-optical recording medium, the recorder comprising:

a light source which irradiates the recording medium with a recording light beam;

a magnetic field applying device which applies a recording magnetic field; and a modulator which modulates record data represented by a data train with a data bit in at least one of a recording direction and a data bit in the direction opposite to the recording direction, such that a data bit in the direction opposite to the recording direction is interposed between the bits of the train; and the modulator outputting a signal with which to modulate at least one of the recording light beam and the recording magnetic field.

15. The recorder according to claim 14, wherein one of the record data is assigned to a combination of a data bit in the recording direction and a data bit in the direction opposite to the recording direction, and that the other of the record data is assigned to a combination of two data bits in the direction opposite to the recording direction.

16. A recording method for recording information of a long record mark of at least two consecutive bits on a magneto-optical recording medium including a recording layer by radiating a recording light beam onto the medium while applying a magnetic field in a recording direction to the medium, the method comprising:

forming recorded magnetic domains such that, when at least two consecutive bits of record information are recorded on the recording layer, a group of recorded magnetic domains which represents the consecutive bits of record information includes at least one magnetic domain magnetized in the direction opposite to the recording direction.

17. The recording method according to claim 16, wherein a signal based on the at least two consecutive bits of information is modulated such that the group of recorded magnetic domains representing the consecutive bits of record information includes a magnetic domain magnetized in the direction opposite to the recording direction.

* * * * *